United States Patent [19]

Musch et al.

[11] 4,443,583

[45] Apr. 17, 1984

[54] PROCESS FOR THE PRODUCTION OF CHLOROPRENE POLYMER MIXTURES

[75] Inventors: Rüdiger Musch, Bergisch-Gladbach; Gottfried Pampus, Cologne; Rudolf Casper, Leverkusen; Peter Müller, Kerpen; Wilhelm Göbel, Leverkusen, all of Fed. Rep. of Germany

[73] Assignee: Bayer Aktiengesellschaft, Leverkusen, Fed. Rep. of Germany

[21] Appl. No.: 386,883

[22] Filed: Jun. 10, 1982

[30] Foreign Application Priority Data

Jun. 16, 1981 [DE] Fed. Rep. of Germany ....... 3123905

[51] Int. Cl.³ ............................................. C08L 11/00
[52] U.S. Cl. .................................. 525/215; 524/501; 525/235; 526/213; 526/291
[58] Field of Search ................. 525/215, 235; 524/501

[56] References Cited

U.S. PATENT DOCUMENTS 3,876,732  4/1975  Kitagawa et al. .................. 525/215

*Primary Examiner*—J. Ziegler
*Attorney, Agent, or Firm*—Connolly and Hutz

[57] ABSTRACT

A process for the production of polychloroprene mixtures of sol and gel polymers in a ratio, by weight, of rom 1:4 to 9:1, the gel polymer being produced by radical emulsion polymerization from chloroprene in the presence of 4 to 10% by weight of water soluble disproportionated abietic acid, and the sol polymer being produced by radical emulsion polymerization of chloroprene in the presence of not more than 3.5% by weight of a water soluble disproportionated abietic acid with the polychloroprene mixture containing at most 3.8% of said acid.

5 Claims, No Drawings

PROCESS FOR THE PRODUCTION OF CHLOROPRENE POLYMER MIXTURES

This invention relates to a process for the precipitation-free polymerisation of chloroprene in aqueous emulsion in the presence of defined quantities of emulsifier to form stable, storable latices and solid rubbers of which the raw material and vulcanisate properties are largely unaffected by the age of the latex.

In order to broaden the scope of application of polychloroprene rubbers, it is necessary to improve the processibility thereof. Processibility is to be understood to include, for example, a high injection capacity on extrusion, minimal swelling on extrusion and high dimensional stability of the extrudates.

Polychloroprene rubbers having these properties may be produced by mixing benzene-soluble polychloroprene latex (sol polymer) and gel-containing polychloroprene latex (gel polymer) and working-up the resulting mixture, for example by low temperature coagulation, to form the solid rubber.

Such production processes are described in DE-AS No 1,720,107 and in GB-PS No. 1,158,970. However, the improvement in processibility is achieved at the expense of numerous disadvantages, for example poor stability of the gel-containing latex in storage, poor viscosity stability of the crude rubber and tensile strengths of the vulcanisates which are considerably poorer than those of the sol polymers.

German Auslegeschrift Nos. 2,008,673 and 2,241,394 propose various measures for avoiding this undesirable deterioration in properties. These measures have only been partially successful. In particular, it has not been possible to overcome the marked dependence of the viscosity stability of the crude rubber and the tensile strength of the vulcanisates upon the age of the latex, particularly its gel component.

It has now been found that it is possible to produce storable, cross-linked polychloroprene latices which, after mixing with sol polymers and working-up, give solid rubbers of which the raw material and vulcanisate properties are largely unaffected by the age of the polychloroprene latex.

Accordingly, the present invention relates to a process for the production of polychloroprene mixtures of sol and gel polymer in a ratio, by weight, of from 1:4 to 9:1, the gel polymer being produced by radical emulsion polymerisation from chloroprene and from 1 to 4 mole percent, based on the molar quantity of chloroprene, of a diester of a dihydric alcohol and an acrylic acid in the presence of a water-soluble saturated or unsaturated monocarboxylic acid, in the presence of a condensation product of naphthalene sulphonic acid and formaldehyde and in the presence of potassium hydroxide and the sol polymer being produced by radical emulsion polymerisation from chloroprene in the presence of a water-soluble, saturated or unsaturated monocarboxylic acid, in the presence of a condensation product of naphthalene sulphonic acid and formaldehyde and in the presence of potassium hydroxide, characterised in that the quantity of water-soluble, saturated or unsaturated monocarboxylic acid used in the production of the gel polymer amounts to from 4 to 10%, by weight, based on the monomer total, in that the quantity of water-soluble saturated or unsaturated monocarboxylic acid used in the production of the sol polymer does not exceed 3.5%, by weight, based on the monomer total, and in that the polychloroprene mixture contains at most 3.8%, by weight, based on the monomer total, of water-soluble saturated or unsaturated monocarboxylic acid.

The diester preferably corresponds to the following general formula:

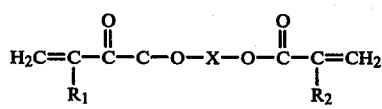

wherein
R$^1$ and R$^2$ independently represent hydrogen or C$_1$–C$_4$ alkyl; and
X represents C$_2$–C$_{10}$ alkylene.

The diester is preferably used in a quantity of from 2 to 2.5 mole percent. The preferred diester is ethylene glycol dimethacrylate.

The water-soluble saturated or unsaturated monocarboxylic acid used is, in particular, disproportionated abietic acid, optionally in admixture with a fatty acid such as oleic acid.

The water-soluble saturated or unsaturated monocarboxylic acid serves as emulsifier. The limitation to 3.8%, by weight, in the polychloroprene mixture is necessary to avoid undesirably high tackiness on the mixing rolls. This advantage becomes particularly clear if the emulsifier content is particularly high during production of the gel polymer and correspondingly low during production of the sol polymer. The emulsifier is preferably used in a quantity of from 4.6 to 6.0%, by weight, in the production of the gel polymer and in a quantity of from 1.2 to 3.4%, by weight, in the production of the sol polymer.

Polymerisation of the two components may be carried out continuously or in batches, continuous polymerisation being preferred. Polymerisation is carried out by the conventional methods of the type described, for example, in German Auslegeschrift Nos. 1,720,107; 2,008,673 and 2,650,714. Working-up by low-temperature coagulation may be carried out, for example, by the method described in German Auslegeschrift No. 1,051,606.

The quantity of condensation product of naphthalene sulphonic acid and formaldehyde preferably amounts to from 0.3 to 1.0%, by weight, while the quantity of potassium hydroxide preferably amounts to from 0.4 to 1.0%, by weight, based in each case on the monomer total.

50% of the potassium ions may be replaced by other alkali metal ions.

COMPARISON EXAMPLE 1 (Sol polymer)

The aqueous phase W and the monomer phase M were initially introduced into a coolable reaction vessel and the activator phase A continuously introduced thereafter:

| | |
|---|---|
| Monomer phase M: | |
| Chloroprene | 100.0 g |
| n-dodecyl mercaptan | 0.22 g |
| Aqueous phase W: | |
| Deionised water | 130.0 g |
| Potassium salt of disproportionated abietic acid | 3.5 g |
| Potassium salt of the condensation product of naphthalene sulphonic acid and formaldehyde | 0.7 g |

-continued

| | |
|---|---|
| Potassium hydroxide | 0.9 g |
| Activator phase A: | |
| 3% by weight aqueous formamidine sulphinic acid solution (run in continuously). | 3.5 ml |

The reaction begins readily at an internal temperature of 40° C. The heat of polymerisation given off is dissipated by external cooling and the polymerisation temperature maintained at +45° C. The reaction is terminated at a monomer conversion of 66% by the addition of phenothiazine. The residual monomer is removed from the polymer by steam distillation and the polymer latex stored at 10° C.

COMPARISON EXAMPLE 2 (Gel polymer)

The procedure is as in Example 1 using the following quantities:

| | |
|---|---|
| Monomer phase M: | |
| Chloroprene | 96.0 g |
| Ethylene glycol dimethacrylate | 4.0 g |
| n-dodecyl mercaptan | 0.3 g |
| Aqueous phase W: | |
| Deionised water | 130.0 g |
| Potassium salt of disproportionated abietic acid | 2.2 g |
| Potassium salt of the condensation product of naphthalene sulphonic acid and formaldehyde | 0.7 g |
| Potassium hydroxide | 0.4 g |
| Activator phase A: | |
| 3% by weight aqueous formamidine sulphinic acid solution (run in continuously). | 3.8 ml |

The reaction is terminated at a monomer conversion of 80% by the addition of phenothiazine. The residual monomer is removed from the polymer by steam distillation. The polymer latex is stored at +10° C.

COMPARISON EXAMPLES 3–7 (Different quantities of emulsifier)

The gel and sol polymer latices are prepared in the same way as in Examples 1 and 2 in the presence of different quantities of emulsifier, stored for 10 days, the gel polymer latex mixed with the sol polymer latex in a weight ratio of 40:60 and the rubber isolated.

| | Content of disproportionated abietic acid in %, by weight, based on the quantity of monmer | | |
|---|---|---|---|
| Example No. | Sol polymer | Gel polymer | Total content in the mixture |
| 3 | 3.5 | 2.2 | 3.0 |
| 4 | 3.5 | 3.5 | 3.5 |
| 5 | 3.5 | 5.2 | 4.2 |
| 6 | 3.5 | 7.0 | 4.9 |
| 7 | 5.2 | 5.2 | 5.2 |

EXAMPLES 8 and 9

The gel polymer latex and sol polymer latex are prepared in the same way as in Examples 1 and 2 in the presence of different quantities of emulsifier, stored for 10 days, the gel polymer latex mixed with the sol polymer latex in a ratio of 40:60 and the rubber isolated.

| | Content of disproportionated abietic acid in %, by weight, based on the quantities of monomer | | |
|---|---|---|---|
| Example No. | Sol polymer | Gel polymer | Mixture |
| 8 | 1.7 | 5.2 | 3.1 |
| 9 | 2.4 | 5.2 | 3.5 |

Determination of viscosity stability

| Example No. | ML-4 | ML-4 (3 days/70° C.) | Δ ML |
|---|---|---|---|
| 3 | 53 | 79 | +26 |
| 4 | 51 | 73 | +22 |
| 5 | 54 | 58 | +4 |
| 6 | 51 | 56 | +5 |
| 7 | 53 | 57 | +4 |
| 8* | 53 | 58 | +5 |
| 9* | 52 | 56 | +4 |

*Example according to the invenhton

After working-up to form the rubbeh, the Mooney viscosity of the test specimens is determined (DIN 53523).

To determine viscosity stability, the test specimens are stored for 3 days at 70° C. and the viscosity thereof measured again. The more stable the products, the smaller the difference in viscosity (ΔML) between the two measurements.

Determination of tackiness on mixing rolls/calender test

The reduced tackiness on mixing rolls of the polymers according to the present invention is demonstrated by a semi-practical test. The following substances are initially mixed over a period of 4 minutes in a laboratory kneader:

| | |
|---|---|
| Polymer | 100 g |
| Carbon black N-472 | 30 g |
| Aromatic mineral oil | 15 g |
| Phenyl-α-naphthylamine | 1 g |
| Stearic acid | 0.5 g |
| Magnesium oxide | 4 g |
| Zinc oxide | 5 g |

After storage for about 24 hours at room temperature the mixture is preheated to from 50° to 55° C. on mixing rolls and then drawn out to form a 0.5 mm thick band on a three-roller laboratory calender (roller length 400 mm; roller diameter 200 mm) with friction ratios of 1:1.31 between the 1st and 2nd rollers and 1:1 between the 2nd and 3rd rollers. Assessment of tackiness;
1=sheet does not stick (is not entrained by the faster roller)
2=sheet sticks slightly (is entrained to a certain extent by the faster roller)
3=sheet sticks (is entrained by the faster roller)
4=sheet sticks firmly (can only be peeled off with difficulty)
5=sheet sticks very firmly (cannot be peeled off at all)

| | Temperature of the rollers (°C.) | | |
|---|---|---|---|
| Setting | 1 | 2 | 3 |
| A | 35 | 40 | 50 |
| B | 40 | 45 | 55 |

| | -continued | | |
|---|---|---|---|
| C | 43 | 52 | 60 |

| Setting | Polymer of Example No. | | | | | | |
|---|---|---|---|---|---|---|---|
| | 8 | 3 | 9 | 4 | 5 | 6 | 7 |
| A | 1-2 | 1-2 | 2 | 2 | 3-4 | 4 | 4 |
| B | 2 | 2 | 2 | 2 | 3-4 | 4 | 5 |
| C | 2-3 | 2-3 | 2-3 | 2-3 | 4 | 5 | 5 |

It may be seen from both Tables that, for the same total emulsifier content of the mixture (Examples 8 and 3/9 and 4), the degree of tackiness on mixing rollers is identical, although stability in storage may be distinctly improved by the measures according to the present invention. Although an excessive emulsifier content (Examples 5, 6, 7) has a favourable effect upon the stability of the rubber in storage, it has a highly adverse affect upon tackiness on mixing rolls.

Vulcanisate testing

Production of the mixtures, vulcanisation and testing of the vulcanisates are carried out in according with ISO Specification No. 2475-1975 (E).

Before the mixture is actually produced, 1000 g of polychloroprene are masticated for 6 minutes, the gap between the rollers being adjusted to such a width that a bead approximately 12 mm in diameter is formed. After mastication, 800 g of rubber are removed and stored for at least 10 minutes and for at most 120 minutes.

| Mixing rolls | 200 × 390 mm |
|---|---|
| Temperature | 45-55° C. |
| Friction | 1:1.4 (24:34 r.p.m.) |

Before the beginning of mixing, the mixing rolls adjusted to a temperature of 30° C. are heated by means of waste rubber to the indicated lower limit to the working temperature range. Test mixture

| Constituents | |
|---|---|
| Polychloroprene | 100.00 g |
| Stearic acid | 0.50 g |
| Magnesium oxide | 4.00 g |
| Phenyl-α-naphthylamine | 2.00 g |
| Active carbon black | 30.00 g |
| Zinc oxide | 5.00 g |
| Ethylene thiourea | 0.50 g |
| | 142.00 g |

The mixing sequence and mixing times are as indicated. After mixing for 13 minutes, the rough sheet is sheared in opposite directions (3 times to the left and 3 times to the right) for 1 minute and then drawn 6 times over a period of 2 minutes through a 0.8 mm wide roller gap, giving a total mixing time of 16 minutes.

The mixture should have been stored for at least 15 hours (overnight) before vulcanisation.

| Temperature | 130° C. |
|---|---|
| Time | 40 minutes |

The test data are determined in accordance with the corresponding DIN Specifications for soft rubber. A 4 mm thick $R_1$ standard ring is used for determining strength, breaking elongation and modulus in accordance with DIN 53 504 and ISO 37-1976.

| Polymer of Example No. | Vulcanisate properties: | | | | |
|---|---|---|---|---|---|
| | 8 | 3 | 9 | 4 | 7 |
| Strength (MPa) | 16.7 | 11.7 | 16.9 | 13.3 | 14.4 |

The polymers produced in accordance with the present invention (Examples 8, 9) have distinctly higher vulcanisate strengths than the polymers produced in accordance with the Comparison Examples (3, 4) for the same emulsifier content.

We claim:

1. A process for the production of polychloroprene mixtures of sol and gel polymers in a ratio, by weight, of from 1:4 to 9:1, the gel polymer being produced by radical emulsion polymerization from chloroprene and from 1 to 4 mole percent, based on the molar quantity of chloroprene, of a diester of a dihydric alcohol and an acrylic acid in the presence of a potassium salt of, disproportionated abietic acid, in the presence of a condensation product of naphthalene sulphonic acid and formaldehyde and in the presence of potassium hydroxide and the sol polymer being produced by radical emulsion polymerization from chloroprene in the presence of a the, disproportionated abietic acid, in the presence of a condensation product of naphthalene sulphonic acid and formaldehyde and in the presence of potassium hydroxide, wherein the quantity of the, disproportionated abietic acid used in the production of the gel polymer amounts of from 4 to 10%, by weight, based on the quantity of monomer, the quantity of the, disproportionated abietic acid, used in the production of the sol polymer does not exceed 3.5%, by weight, based on the quantity of monomer, and the polychloroprene mixture contains at most 3.8%, by weight, based on the monomer total, of the, disproportionated abietic acid.

2. The process of claim 1, wherein the diester corresponds to the following general formula:

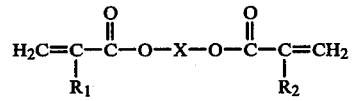

wherein
$R_1$ and $R_2$ represent hydrogen or $C_1$-$C_4$ alkyl; and
X represents $C_2$-$C_{10}$ alkylene.

3. The process of claim 1, wherein
from 4.6 to 6.0%, by weight, of the water-soluble, saturated or unsaturated monocarboxylic acid are used in the production of the gel polymer and from 1.2 to 3.4%, by weight, in the production of the sol polymer.

4. The process of claim 1, wherein
the quantity of condensation product of naphthalene sulphonic acid and formaldehyde amounts to from 0.3 to 1.0%, by weight, and the quantity of potassium hydroxide to from 0.4 to 1.0%, by weight, based in each case on the monomer total.

5. The process of claim 1, wherein
up to 50% of the potassium ions may be replaced by other alkali metal ions.

* * * * *